Aug. 1, 1967 G. M. GORDON ETAL 3,333,461
ELASTIC MODULUS MEASUREMENT APPARATUS
Filed July 14, 1964 2 Sheets-Sheet 1

INVENTORS
GERALD M. GORDON
ALEIDUS BOSMAN
BY
Samuel Lindenberg
ATTORNEY

INVENTORS
GERALD M. GORDON
ALEIDUS BOSMAN
BY Samuel Lindenberg
ATTORNEY

3,333,461
ELASTIC MODULUS MEASUREMENT APPARATUS
Gerald M. Gordon, Los Altos, Calif., and Aleidus Bosman, Wassenaar, Netherlands, assignors to Stanford Research Institute, Menlo Park, Calif., a corporation of California
Filed July 14, 1964, Ser. No. 382,523
4 Claims. (Cl. 73—88)

This invention relates generally to the testing of materials and more particularly to a method and apparatus for determining the elastic modulus of a material.

The elastic modulus (Young's modulus) of a material is defined as the ratio of a stress to the corresponding strain and providing the elastic limit is not exceeded, is found to be constant and characteristic of a given material.

Various experimental methods are known in the prior art for determining the elastic modulus of a material. Many of these methods are of the destructive type in which a sample of the material under test is actually torn apart. Some non-destructive testing methods are also known which, for example, use vibration techniques to determine the elastic modulus. Each of the prior art methods of course is characterized by certain advantages and disadvantages. One significant disadvantage of most prior art techniques is that relatively high priced equipment is required. A further disadvantage of several prior art techniques is that they are not well suited for testing materials at elevated temperatures.

Consequently, it is an object of the present invention to provide a method and apparatus for non-destructively and inexpensively determining the elastic modulus of a material.

It is a further object of the present invention to provide a method and apparatus for identifying an unknown material.

Briefly, the invention herein is based upon the recognition that the duration of elastic impact of a device with a material under test will vary in accordance with the elastic modulus of the material. Thus, by initially determining the impact during of a device having constant characteristics with each of a plurality of reference materials, the elastic modulus of an unknown material can be determined by measuring the impact duration of that device with the unknown material and comparing it with the impact durations for the reference materials.

In accordance with a preferred embodiment of the invention, an impact device in the form of a sphere is provided. The sphere is swung like a pendulum and is permitted to elastically collide with a sample of the material under test. If the sample is of an electrically conductive material, a simple way of measuring the impact duration is to treat the sample and the sphere as switch electrodes in a circuit which is completed when the electrodes are in contact. The circuit can include the vertical deflection plates of an oscilloscope so as to permit a rectangular pulse to be developed whose width is representative of the collision time.

If an electrically non-conductive sample is being tested, the impact duration can be determined on the basis of the duration of a period during which the capacitance between the sphere and a ring positioned close to the surface of the sample, is within certain limits.

The novel features that are considered characteristic of this invention are set forth with particularity in the appended claims. The invention itself both as to its organization and method of operation, as well as additional objects and advantages thereof, will best be understood when read in connection with the accompanying drawings, in which:

Figure 1:
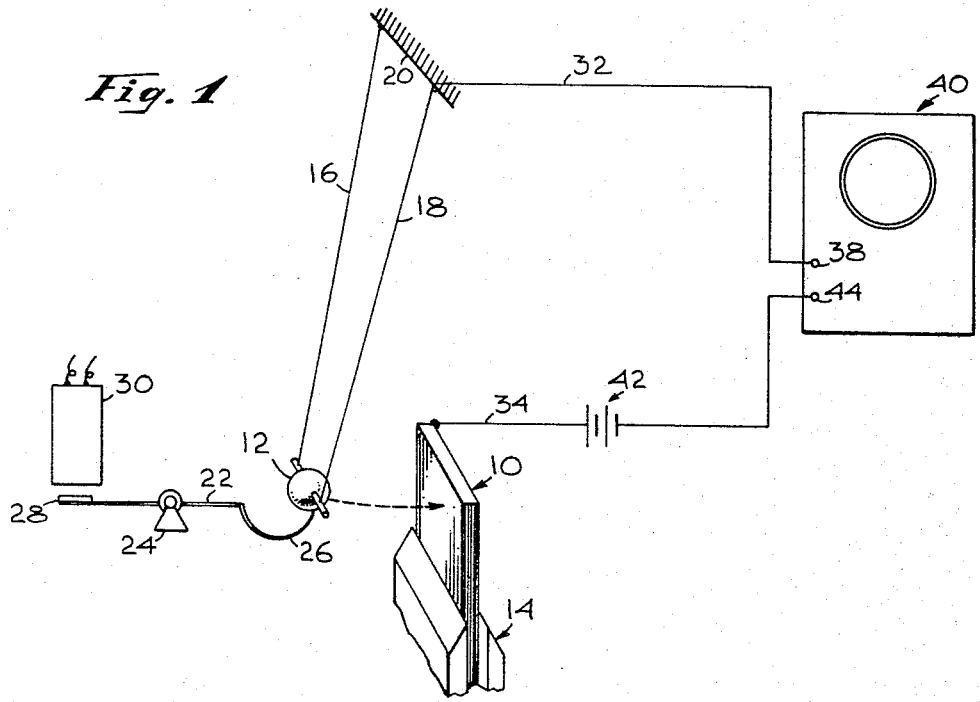
FIGURE 1 is a schematic diagram of an apparatus set-up which permits the method of the invention to be practiced to determine the elastic modulus of an electrically conductive material.

Attention is now called to FIGURE 1 of the drawings which illustrates apparatus for determining the elastic modulus or the material identity of a sample of material 10. As has been indicated, the elastic modulus of a material is characteristic of that material and can be used to identify the material. It has also been indicated that the impact duration of an elastic collision between two bodies is related to the elastic modulus of the bodies' materials. Thus, by causing an impact device such as a sphere 12 to elastically collide with each of a pluraltiy of samples of identified materials, and by measuring the impact duration of each of these collisions, a sample of unknown material can be subsequently identified by determining the impact duration between it and the impact device 12.

An exemplary apparatus for causing an appropriate elastic collision between the impact device 12 and the sample 10 is illustrated in FIGURE 1 and includes a vise 14 for securely holding the sample 10. The impact device 12 can be secured to a pair of metal wires 16 and 18 which are suspended from a support 20. Thus, the impact device 12 can be swung on the wires 16 and 18 as a pendulum and can thus be caused to collide with the sample 10.

In order to assure that successive collisions between the impact device 12 and the sample 10 occur at the same velocity, a release assembly is provided for holding the impact device 12 and for subsequently releasing it to permit it to collide with the sample 10. The release assembly includes an arm 22 pivotally mounted on support 24. The arm 22 has a cup-shaped end 26 which is adapted to receive and hold the impact device 12 when the arm 22 is in the position illustrated in FIGURE 1. An armature 28 is secured to the end of 22 remote from the cup portion 26. A solenoid 30 is positioned adjacent the armature 28. In response to the energization of the solenoid 30, the armature 28 will be drawn thereto to thus pivot the arm 22 so as to cause the impact device 12 to be released and thereby permit to collide with the sample 10.

In order to measure the impact duration between the impact device 12 and the sample 10, the circuit arrangement illustrated in FIGURE 1 can be employed if the sample is of an electrically conductive material. In this event, a conductor 32 can be connected to the wire 18 which is electrically connected to the impact device 12. A conductor 34 can be electrically connected to the sample 10. The conductor 32 can be connected to a first vertical deflection terminal 38 of a conventional oscilloscope 40 and the conductor 34 can be connected through a direct current source 42 to a second vertical deflection terminal 44.

In the operation of the apparatus of FIGURE 1, the cathode ray tube beam of the oscilloscope 40 can be caused to scan horizontally across the tube at a constant rate. The solenoid 30 can be energized to permit the impact device 12 to collide with the sample 10. While the impact device 12 and sample 10 are in contact, the direct current potential provided by source 42 will be applied across terminals 38 and 44 and thus deflect the beam vertically to trace a rectangular pulse on the cathode ray tube whose width is indicative of the contact duration between the impact device 12 and the sample 10.

In the event the sample is of an electrically non-conductive material, the test apparatus of FIGURE 1 would of course not be suitable. The test apparatus of FIGURE 2 can be used to determine the elastic modulus of a sample of non-conductive material 46. In this case, an electrode, preferably in the form of a ring 48 is mounted adjacent to the surface of the sample 46 with which the impact device 50 is intended to collide. A conductor 52 is connected to the electrode 48 and a conductor 54 is connected through one of the supporting wires to the impact device 50. The conductors 52 and 54 are connected to the input of a capacitance sensing device 56. The output of the capacitance sensing device is connected across the vertical deflection terminals 58 and 60 of an oscilloscope 62. The same release assembly as is shown in FIGURE 1 can be used with the apparatus of FIGURE 2 for controlling the impact device 50.

Figure 2:
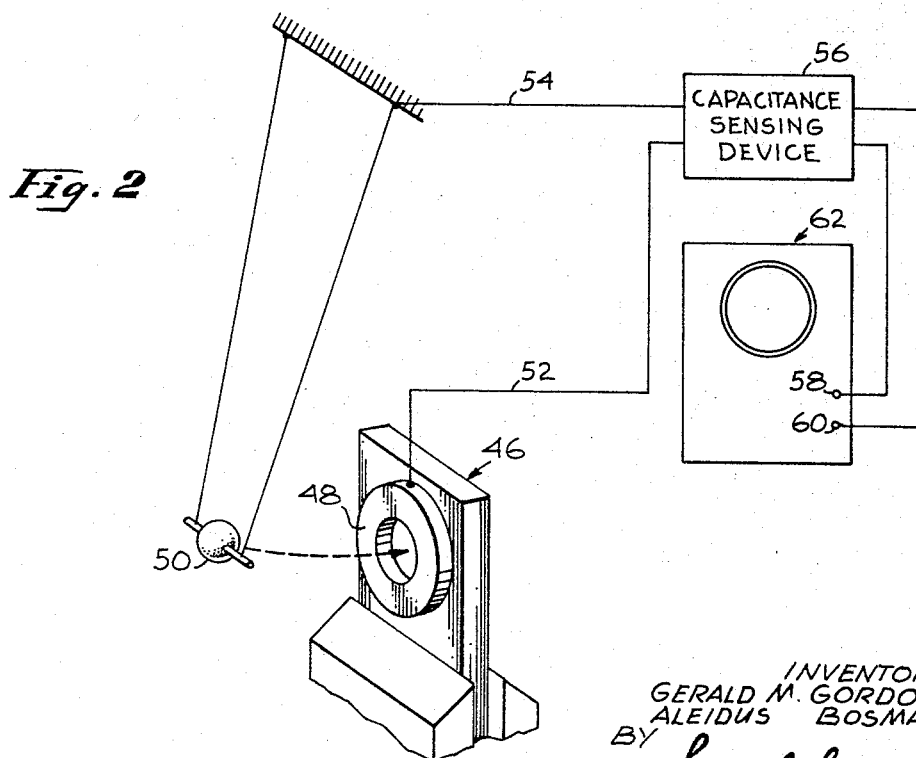
FIGURE 2 is a schematic diagram of apparatus which permits the method of the present invention to be practiced to determine the elastic modulus of an electrically non-conductive material.

In the operation of the apparatus of FIGURE 2, the capacitance sensing device 56 will apply a direct current potential across the terminals 58 and 60 only when the capacitance between the impact device 50 and ring 48 is within predetermined limits. These limits can be determined by initially placing the impact device 50 against the material 46 within the ring 48. When the device 58 is subsequently swung into contact with the plate 46, the contact time between the impact device 50 and sample 46 should of course be substantially equal to the duration of the period during which the capacitance between the impact device 50 and electrode 48 is substantially equal to the previously measured value. The capacitance sensing device can include an oscillator circuit which oscillates at a very high frequency only when a critical capacitance value exists across its input terminals. The device 56 can provide the direct current deflection potential across terminals 58 and 60 only when the circuit is oscillating.

Figure 3:
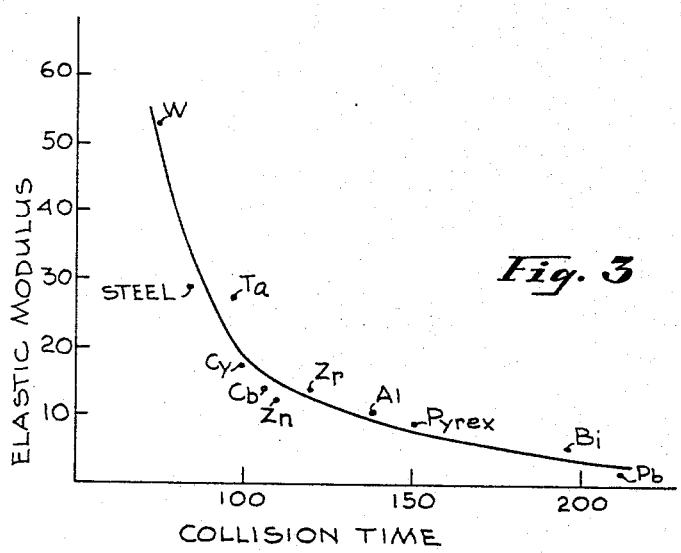
FIGURE 3 is a graph in which elastic modulus versus measured collision time is plotted for a plurality of different reference materials.

By subjecting a plurality of samples of identified materials to collision tests with the apparatus of FIGURES 1 and 2, the plot of FIGURE 3 can be empirically derived. The vertical axis of FIGURE 3 corresponds to the elastic modulus, the units being represented in $10^{-6}$ pounds per square inch and the horizontal axis corresponds to collision time duration represented in microseconds. It should be noted that the differences between impact duration for different materials is fairly substantial thus enabling a sample of unknown material to be reasonably easily identified.

In addition to being able to identify an unknown material utilizing the described method and the plot of FIGURE 3, the elastic modulus of a material can be quantitatively determined by utilization of the plot of FIGURE 3. Thus, assuming that the impact duration between a standard impact device utilized to develop the plot of FIGURE 3, and a sample, was on the order of 150 microseconds, then it can be concluded that the elastic modulus of the material is on the order of $(10 \times 10^{-6})$ pounds per square inch.

Figure 4:
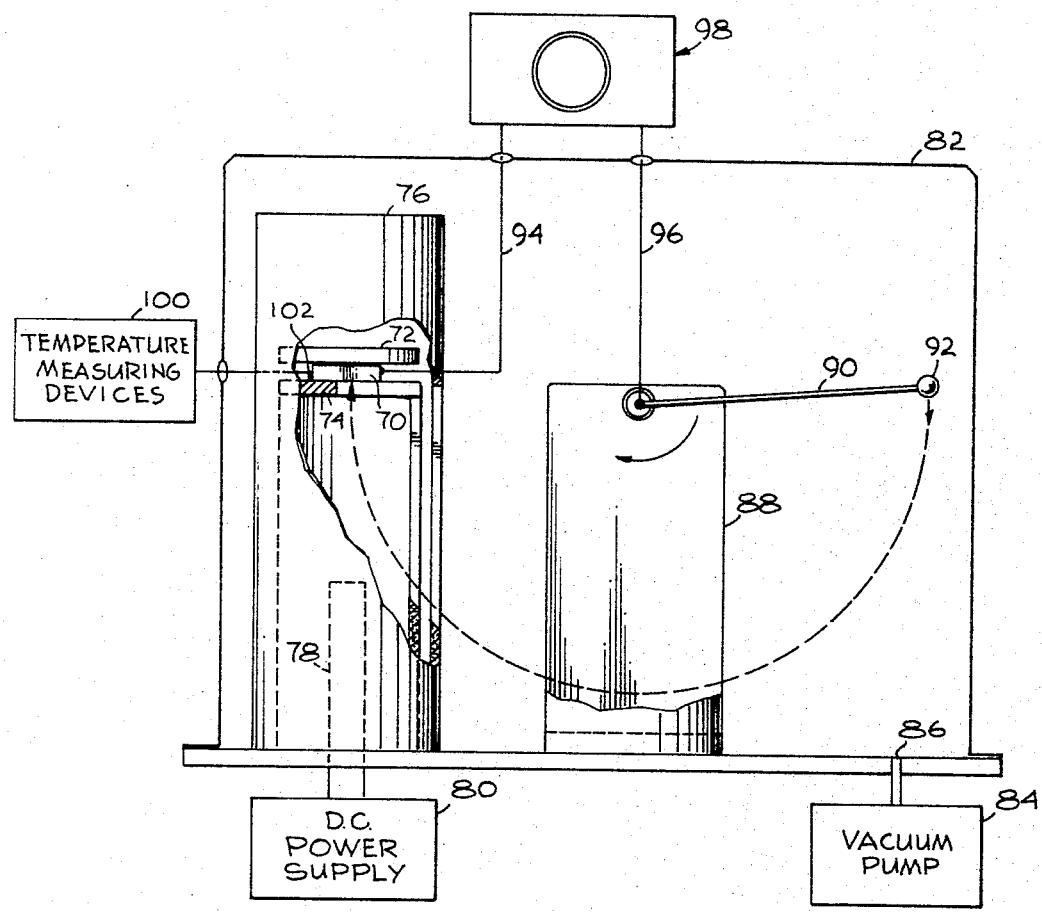
FIGURE 4 is a schematic diagram of apparatus illustrating how the method of the present invention can be employed to determine the elastic modulus of materials under elevated temperatures.

From the foregoing, it should be appreciated that a method and apparatus has been provided herein which enables the elastic modulus of materials to be rapidly, easily, and inexpensively determined by measuring the impact duration between a standard impact device and a sample of the material. The aforedescribed method is particularly valuable because it permits the elastic modulus of materials to be determined at elevated temperatures as well as standard temperatures. For example, consider the apparatus illustrated in FIGURE 4 in which the sample 70 is secured between a pair of heat shields 72 and 74 in an oven 76. An electrical heating element 78, powered by a DC supply 80, can be mounted in the oven 76. The oven 76 is preferably supported in a vacuum chamber 82 which is exhausted by a vacuum pump 84 through an outlet 86.

Mounted within the vacuum chamber 82 is a support 88 pivotally supporting an arm 90 terminally carrying an impact device 92. The oven 76 is provided with an entrance opening permitting the impact device 92 to swing into the oven into engagement with the sample 70. Conductors 94 and 96 are respectively connected to the sample 70 and impact device 92 and are in turn connected across input terminals of circuit apparatus 98 of the type illustrated in either FIGURE 1 or 2. In order to determine the temperature of the sample 70, a temperature measuring device 100 is connected to a thermocouple 102 adjacent the sample 70. The heat shields 72 and 74 are provided to minimize end heating effects.

What is claimed is:

1. Apparatus for determining the elastic modulus of a sample of material comprising means rigidly mounting said sample and exposing at least one surface thereof, an impact device, means mounting said impact device to swing as a pendulum, means for causing an elastic collision between said impact device and said surface, and means for measuring the time duration said impact device and said surface are in contact, said means including circuit means connected between said impact device and said sample, said circuit means being energized only in response to said impact device and said sample being in electrical contact.

2. The apparatus of claim 1 wherein said circuit means includes an oscilloscope having first and second vertical deflection terminals respectively connected to said impact device and said sample.

3. The apparatus of claim 1 wherein said means for measuring the time duration includes an electrode supported adjacent to said surface; means for measuring the capacitance between said impact device and said electrode; and timing means for determining the duration that said capacitance between said impact device and said electrode is within predetermined limits.

4. The apparatus of claim 1 including means for heating said sample to a desired temperature.

References Cited

UNITED STATES PATENTS

| | | | |
|---|---|---|---|
| 2,362,589 | 11/1944 | Simmons | 73—94 |
| 2,375,033 | 5/1945 | Parke | 73—15.4 |
| 3,209,585 | 10/1965 | Wolstenholme et al. | 73—101 |

FOREIGN PATENTS 13,009  11/1911  Great Britain.

OTHER REFERENCES

Article, Clark et al., Stress-Strain Relations Under Tension Impact Loading, ASTM Proceedings, vol. 38, part II, pages 98–106, Jan. 20, 1939.

JAMES J. GILL, Acting Primary Examiner.

RICHARD C. QUEISSER, J. H. WILLIAMSON,
Examiners.